(12) United States Patent
McIntyre

(10) Patent No.: US 7,431,341 B2
(45) Date of Patent: Oct. 7, 2008

(54) PIPE LINER CONNECTOR

(75) Inventor: Stuart McIntyre, Aberdeen (GB)

(73) Assignee: Boreas Consultants Limited, Aberdeen (GB)

( * ) Notice: Subject to any disclaimer, the term of this patent is extended or adjusted under 35 U.S.C. 154(b) by 0 days.

(21) Appl. No.: 10/522,500

(22) PCT Filed: Jul. 25, 2003

(86) PCT No.: PCT/GB03/03272

§ 371 (c)(1),
(2), (4) Date: Sep. 21, 2005

(87) PCT Pub. No.: WO2004/011840

PCT Pub. Date: Feb. 5, 2004

(65) Prior Publication Data

US 2006/0145479 A1    Jul. 6, 2006

(30) Foreign Application Priority Data

Jul. 25, 2002    (GB)    ................. 0217274.0

(51) Int. Cl.
*F16L 11/12* (2006.01)
(52) U.S. Cl. .................... 285/53; 285/55; 285/370
(58) Field of Classification Search .......... 138/26; 285/55, 53, 49, 370, 13, 14
See application file for complete search history.

(56) References Cited

U.S. PATENT DOCUMENTS

| 2,366,579 | A | * | 1/1945 | Von Ahrens | ................. 285/22 |
| 2,646,995 | A | * | 7/1953 | Thompson | ............ 285/288.11 |
| 3,508,766 | A | | 4/1970 | Kessler | |
| 3,876,233 | A | * | 4/1975 | Schmedding et al. | ......... 285/4 |
| 4,006,920 | A | * | 2/1977 | Sadler et al. | .................. 285/14 |
| 4,357,745 | A | * | 11/1982 | Chlebowski | ................. 29/460 |
| 4,681,349 | A | | 7/1987 | Press et al. | |
| 4,819,965 | A | * | 4/1989 | Press et al. | .................... 285/55 |
| 4,913,465 | A | | 4/1990 | Abbema et al. | |
| 5,566,984 | A | | 10/1996 | Abbema et al. | |
| 5,988,691 | A | | 11/1999 | Cruickshank | |
| 5,992,897 | A | | 11/1999 | Hill et al. | |

FOREIGN PATENT DOCUMENTS

WO    WO-02/33298 A1    4/2002

* cited by examiner

*Primary Examiner*—David E Bochna
(74) *Attorney, Agent, or Firm*—George N. Chaclas; Edwards Angell Palmer & Dodge LLP

(57) ABSTRACT

A pipe liner connector suitable for connecting pipe sections that comprise a liner is described. The pipe liner connector comprise vents and/or venting grooves which act to balance the pressure between the micro-annulus, formed between the liner and the pipe sections, and the pipe bore formed when the pipe sections are connected together. The inclusion of these features helps prevent the collapse or the uncontrolled distortion of the pipe liner connector during pressure cycles in operating pipelines.

17 Claims, 2 Drawing Sheets

PIPE LINER CONNECTOR

CROSS-REFERENCE TO RELATED APPLICATION

This application is the U.S. national phase, pursuant to 35 U.S.C. § 371, of international application No. PCT/GB2003/003272, published in English on Feb. 5, 2004 as international publication No. WO 2004/011840 A1, which claims the benefit of British application Ser. No. GB 0217274.0, filed Jul. 25, 2002, the disclosure of which applications are incorporated herein in their entireties by this reference.

BACKGROUND OF THE INVENTION

The present invention relates to apparatus for the connection of pipe liners. In particular, the apparatus provides a connector suitable for use with a liner employed in a vented oil, gas or other service pipeline.

It is known to those skilled in the art that pipelines and other fluid transport systems (such as tubing used down-hole in oil wells and process pipework in refineries and the like) can have their lifetimes significantly increased by employing a liner. The liner is incorporated within the pipeline so as to reduce the detrimental effects of corrosion or erosion by isolating the bulk fluid from the pipe wall, however they are not intended to be completely impermeable to gases.

The primary restriction on the use of such liners is liner collapse due to pressure build up of gases in the micro-annulus between the liner and the parent pipe. If the differential pressure between the micro-annulus and the pipe bore become sufficient, the liner may collapse and suffer damage.

In PCT Application WO 02/33298 the authors themselves teach of a vented liner that permits controlled communication between the micro-annulus and the bore of the pipe so as to permit pressure balancing and consequent limitation on the pressure differential and the tendency for collapse. However, with any such lined pipe, specific consideration must be given to the physical engineering and construction processes employed to form complete lined fluid transport or pipework system, and this gives rise to a number of ways in which a liner may be inserted.

In some cases it is desirable to pass a length of liner through a significant number of joined pipe sections, whilst in other cases it is desirable to join individual sections of lined pipe. Whichever method is employed, the liner must be terminated at some point, and some means of maintaining the continuity of the corrosion barrier across the joint must be found. This is a particular challenge where the method of jointing is to employ heat (such as welding) as the liner may be degraded during the process. As a result, the liner is often terminated short of the joint so that it will be unaffected by the heat generated during joining. It can also be desirable to terminate the liner short of the joint so as to permit the entry of tools and handling aids into the ends of the pipes without causing damage to the liner in the vicinity of the joint, or affecting the operational effectiveness of the tools employed.

As with any such pipeline specific consideration must be given to the physical engineering and installation of the pipeline with actual operational conditions. It is often problematic to pass a length of liner through a significant number of pipe sections. Therefore it makes practical sense to have a liner section associated with each pipe section, the liner being connected together when the pipe sections are welded.

U.S. Pat. No. 5,992,897 (British Gas/Tom Hill et Al., known as 'Weldlink') teaches of one method of terminating a liner that relies on a layer of corrosion resistant metal to continue the corrosion resistance of the lined system across the joint. However, this method has been found to be very expensive because it relies on high-cost corrosion resistant metallic components and time-consuming work methods.

U.S. Pat. No. 3,508,766 (AMF Tuboscope/Kessler et Al.) teaches of a cylindrical corrosion barrier that contains a heat resistant material that allows welding to be used to join sections of pipe lined with materials that would otherwise be degraded on exposure to high temperatures. To minimise the impact on the bore of the pipe caused by the insertion of the cylindrical barrier, this patent envisages the pipes being formed with belled ends. The cost of providing the belled ends has been found to be prohibitive.

U.S. Pat. No. 4,913,465 (Tuboscope/Abbema et Al., known as 'Thru-kote') also teaches of a cylindrical corrosion barrier for connecting lined pipe sections where welding is to be performed, but in this patent, the cylindrical barrier is entirely within the bore of the host pipe. This method is also unsatisfactory to high-pressure applications because the cylindrical corrosion barriers contain voids of air and other compressible material between the face exposed to pressure and the wall of the host pipe. The leak-tight seals at either side of the joint cause a differential pressure between these voids and the bore of the pipe giving rise to considerable expansion forces which cause it to deform uncontrollably, causing damage and distortion. Increasing the thickness of the cylinder may resist this, but for high pressure applications, this imposes an unacceptable restriction on the bore of the pipe.

A further unsuitable aspect of sealed methods of bridging the joint in a liner occurs where gases may permeate or otherwise accumulate into the sealed spaces and voids between the cylindrical insert and the host pipe. In such circumstances when the pipeline pressure is reduced, collapse may result in the same way as described in the authors own PCT Application WO 02/33298 for the liner itself.

BRIEF SUMMARY OF THE INVENTION

It is an object of at least one aspect of the present invention to provide a pipe connector suitable for connecting sections of lined pipe that overcome the problematic features of the sealed pipe connectors described in the prior art.

According to a first aspect of the present invention there is provided a pipe liner connector suitable for use with pipe sections having an internal liner, the pipe liner connector comprising a substantially cylindrical sleeve having opposed open ends for sealed attachment to the internal liner of a pipe section, and one or more vents for balancing a pressure differential between a micro-annulus, formed between the internal liner and the pipe sections, and a bore defined by the connected pipe sections.

Optionally the pipe liner connector further comprises a shielding ring located between the opposed open ends.

Most preferably the shielding ring is heat resistant so as to protect the pipe liner connector from welding or a similar heat inducing processes.

Optionally an open end comprises a diametrically increased ring section longitudinally displaced from the opening towards the opposed open end, said ring section having one or more venting grooves located on the outer surface thereof and extending longitudinally thereon.

Preferably the open end further comprises one or more seals located between the opening and the ring section and having a diameter intermediate of the cylindrical sleeve and the ring section.

Most preferably the one or more seals provide a liquid tight connection with the internal surface of the liner while the raised ring engages with the internal surface of the pipe section.

Alternatively an open end comprises one or more circumferential grooves suitable for receiving an adhesive and a second vent located between the one or more circumferential grooves and the opening.

According to a second aspect of the present invention there is provided a pipe liner connector for use with a pipe having an internal liner, the pipe liner connector comprising a substantially cylindrical sleeve having opposed first and second open ends, wherein the first open end comprises a first diametrically increased ring section longitudinally displaced from the opening towards the second open end, said ring section having one or more venting grooves located on the outer surface thereof and extending longitudinally thereon.

Preferably the first open end further comprises one or more seals located between the first opening and the first ring section and having a diameter intermediate of the cylindrical sleeve and the first ring section.

Optionally a second diametrically increased ring section, substantially similar to the first ring section, is provided adjacent to the second open end of the cylindrical sleeve.

Preferably the pipe liner connector further comprises a shielding ring located between the first and second ring sections.

BRIEF DESCRIPTION OF THE DRAWINGS

Example embodiments of the present invention will now be described with reference to the following figures.

DETAILED DESCRIPTION OF PREFERRED EMBODIMENTS

Figure 1:
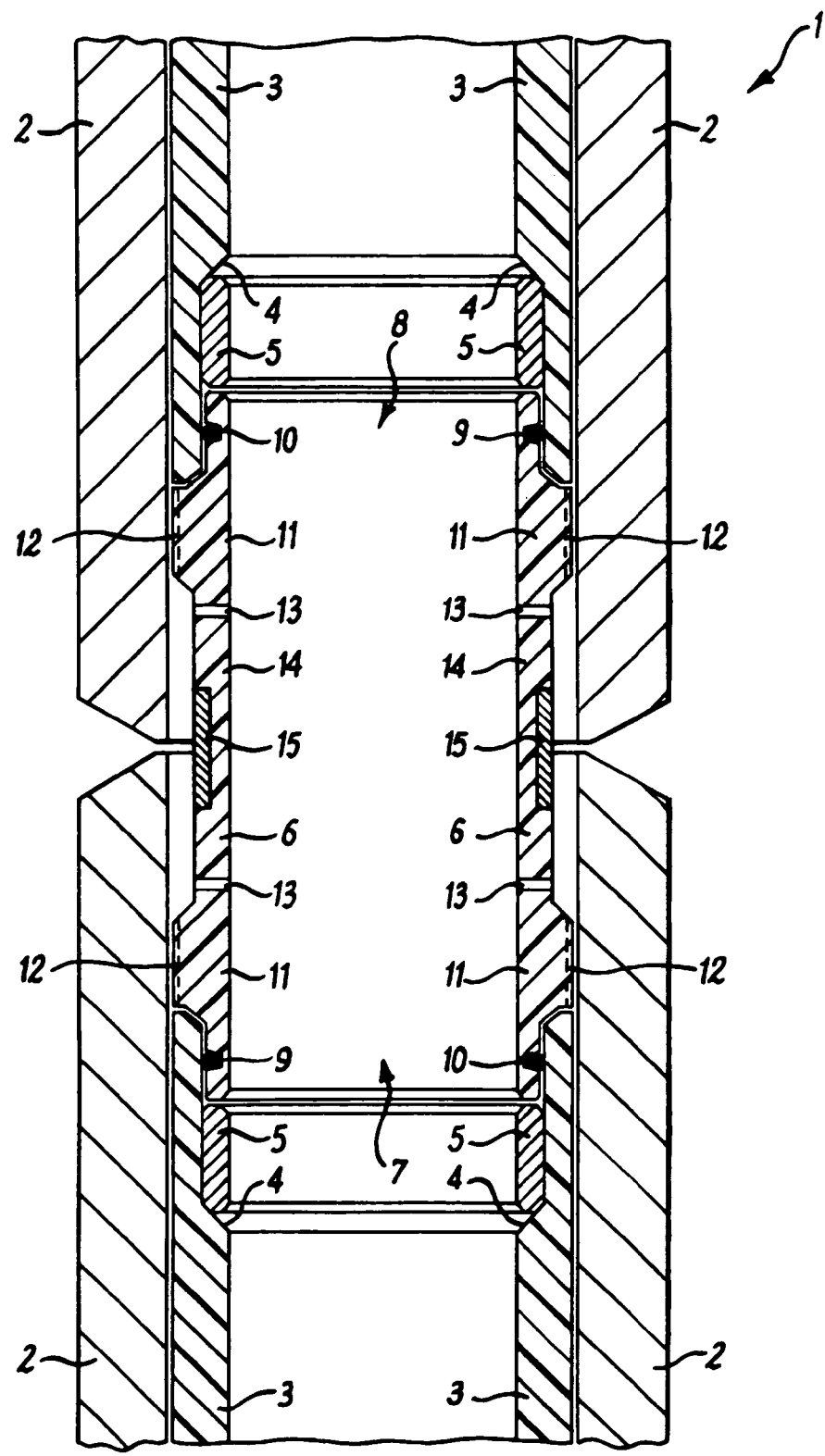
FIG. 1 presents a cross section of a pipe liner connector, in situ with two pipe sections, in accordance with an aspect of the present invention.

Referring to FIG. 1 a cross section of a pipe liner connector 1 is presented in conjunction with two pipe sections 2. Each pipe section 2 comprises a vented liner 3 that terminates with a cylindrical recess 4, of a greater internal diameter than that of the vented liner 3 itself. The cylindrical recesses 4 provide a means for locating the pipe liner connector 1 between two pipe sections 2, thereafter being fixed in position by the employment of locking rings 5.

The locking ring 5 is sized such that when it is inserted it squeezes the liner 3 tightly to the internal surface of the pipe section 2, holding it in place by a spring action and an associated compression in the liner 3. Alternatively, the locking ring comprises fixing screws (not shown) that adjust outwardly to compress the liner 3 to the internal surface of the pipe section 2.

The pipe liner connector 1 comprises a sleeve 6 that is generally in the form of a cylindrical tube having opposed open ends 7 and 8. The outer surface of the sleeve 6 has a diameter that is slightly less than the minimum inner diameter tolerance of the cylindrical recesses 4 therefore allowing adjacent ends 7 and 8 of the pipe liner connector 1 to be inserted into the vented liners 3.

Starting at either end 7 or 8 of the pipe liner connector 1, and working towards the centre, the outer surface of the sleeve 6 can be seen to comprise a number of elements. Initially there is found a groove 9 suitable for locating a sealing ring 10.

The second element is a raised ring section 11. The raised ring section 11 has an outer diameter that is slightly less than the minimum inner diameter tolerance of the pipe section 2 but has a diameter greater than the maximum inner diameter of the cylindrical recess 4. Therefore, when the pipe liner connector 1 is inserted into the pipe section 2 the raised ring section 11 abuts against the end of the vented liner 3 so preventing the pipe liner connector 1 from accidentally passing into the pipe section 2.

In order to equalise the pressure within the micro-annulus between the pipe section 2 and the area of the pipe liner connector 1 between the sealing rings 10 a number of venting grooves 12 are formed longitudinally across the outer surface of the raised ring section 11. In this particular embodiment the venting grooves 12 have a rectangular cross section however a triangular, circular or other suitably shaped cross section may readily be employed.

The third element is a vent 13 located within the body of the sleeve. The vent 13 provides a means for communicating pressure from micro-annulus between the pipe section 2 and the pipe liner connector 1 and the pipe section bore. The vent 13 is made from an engineering grade plastic and contains a "frit" or a porous membrane that controls the flow of gas through the vent 13. Since any by-products in the micro annulus are free to continue across the length of the pipe liner connector 1 and onto the vents 13, the risk of liner collapse around the pipe liner connector 1 is significantly reduced.

The final element of the pipe liner connector 1 is a central shielding portion 14. The central shielding portion 14 comprises a shielding ring 15. When the pipe liner connector 1 is located with two pipe sections 2 the shielding ring 15 locates directly below the interface of the pipe sections 2. With the shielding ring 15 so located the pipe sections 2 may be welded together without the substantial heat generated by the welding process damaging either the pipe liner connector 1 or the vented liner 3.

It will be evident to one skilled in the art that the incorporation of the central shielding portion 14 and the shielding ring 15 can be omitted when there is no welding required to be carried out between two adjacent pipe sections 2. For example this would be the case if the pipe sections 2 were to be joined by screwing the sections together or by flanging.

Figure 2:
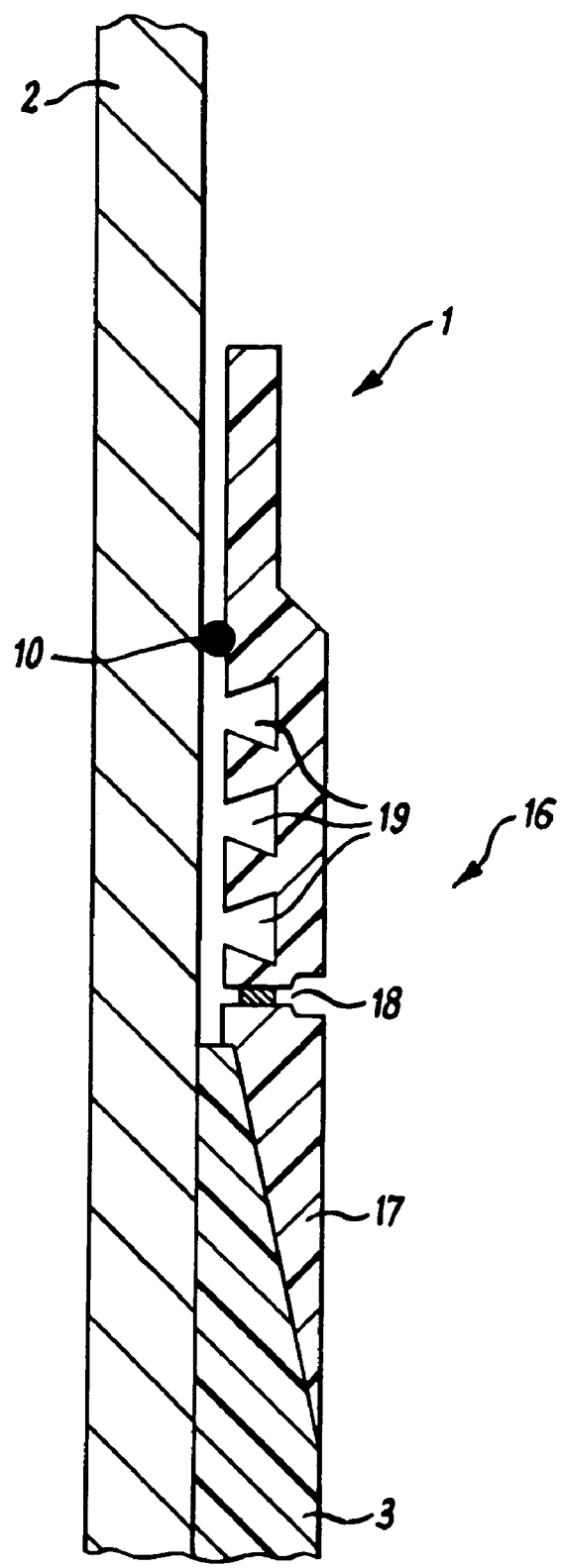
FIG. 2 presents a schematic representation of an adhesive securing end employed in an alternative embodiment of the pipe liner connector.

In an alternative embodiment the pipe liner connector 1 comprises adhesive securing ends 16 as presented in FIG. 2. The adhesive securing ends 16 can be seen to comprise a tapered open end 17, a second vent 18, three circumferential grooves 19 suitable for retaining an adhesive and a sealing ring 10. The adhesive securing ends 16 provide the required sealing for the pipe liner connector 1 while the second vents 18 prevent a build up of pressure within the volume of the micro annulus immediately above the second vent 18.

In a further embodiment (not shown) the adhesive ends further comprises a locking ring. Alternatively, the securing of the liner 3 may take place at some central point so that the cylindrical recess 4 areas are free to expand or contract across the overlapping section with the pipe line connector 1.

A significant advantage of aspects of the present invention is that they provide a means of connecting sections of lined pipe that prevents corrosion by prohibiting any corrosive agents coming into contact with the pipe wall. In addition the inclusion of the venting grooves and the vents helps to preventing the collapse or the uncontrolled distortion of the pipe liner connector during pressure cycles in operating pipelines by allowing a controlled pressure balance between the pipe liner connector and the pipe bore.

A further advantage of the pipe liner connector described in the present invention is that it provides a means for allowing pipe sections comprising associated liners to be welded together without the welding process damaging either the pipe liner connector or the liner. Therefore, by employing the pipe liner connector the construction of pipelines for use in oil and gas production or within the associated refining and transportation industries can be made both more efficient and more cost effective.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention herein intended.

1 Pipe Liner Connector
2 Pipe Section
3 Vented Liner
4 Cylindrical Recess
5 Locking Rings
6 Sleeve
7 First Open End
8 Second Open End
9 Groove
10 Sealing Ring
11 Raised Ring Section
12 Venting Grooves
13 Vent
14 Central Shielding Portion
15 Shielding Ring
16 Adhesive Securing End
17 Tapered Open End
18 Second Vent
19 Circumferential Grooves

The invention claimed is:

1. A pipe liner connector suitable for use with connected pipe sections having an internal liner, the pipe liner connector comprising a substantially cylindrical sleeve located inside the pipe sections having opposed open ends for sealed attachment to the internal liner of the connected pipe sections, one open end including a diametrically increased ring section longitudinally displaced from said open end towards the opposed open end, said ring section having one or more venting grooves located on an outer surface thereof and extending longitudinally thereon, said open end including one or more seals located between the open end and the ring section having a diameter intermediate of the cylindrical sleeve and ring section, wherein the one or more seals provides a liquid tight connection with an internal surface of the internal liner while the ring section engages with an internal surface of the pipe section, and the substantially cylindrical sleeve defines one or more vents extending radially through the cylindrical sleeve to provide fluid communication, in use, between a micro-annulus, formed between the internal liner and the connected pipe sections, and a bore defined by the connected pipe sections, for balancing a pressure differential between the micro-annulus and the bore.

2. A pipe liner connector as claimed in claim 1 wherein the pipe liner connector further comprises a shielding ring located between the opposed open ends.

3. A pipe liner connector as claimed in claim 2 wherein the shielding ring is heat resistant.

4. A pipe liner connector as claimed in claim 1 wherein an open end comprises one or more circumferential grooves suitable for receiving an adhesive and a second vent located between the one or more circumferential grooves and the open end.

5. A pipe assembly comprising:
a pipe having first and second pipe sections defining respective axial bores;
an internal pipe liner comprising first and second liner sections located within the respective first and second pipe sections, wherein an end of the first pipe section substantially abuts an end of the second pipe section such that the bores are substantially aligned; and
a pipe liner connector located inside the pipe sections for connecting the first liner section to the second liner section, the pipe liner connector including a substantially cylindrical sleeve having opposed open ends for sealed attachment to the first and second internal liner sections of the connected pipe sections;
wherein a micro-annulus is formed between the internal pipe liner and the pipe; and
wherein the cylindrical sleeve defines one or more vents extending radially therethrough thereby providing fluid communication between the micro-annulus and the aligned bores to balance a pressure differential therebetween.

6. A pipe assembly as claimed in claim 5 wherein the cylindrical sleeve includes a diametrically increased ring section longitudinally displaced from each open end.

7. A pipe assembly as claimed in claim 6 wherein the increased ring sections have one or more venting grooves located on an outer surface thereof and extending longitudinally thereon.

8. A pipe assembly as claimed in claim 5 wherein each open end defines one or more circumferential grooves suitable for receiving an adhesive.

9. A pipe assembly as claimed in claim 8 wherein each open end defines a second vent located between the one or more circumferential grooves and the open end.

10. A pipe assembly as claimed in claim 5 wherein the pipe liner connector further comprises a shielding ring located radially inward and adjacent a substantially annular notch formed by the substantially abutting ends to facilitate welding the abutting ends together.

11. A pipe assembly as claimed in claim 10 wherein the shielding ring at least partially forms the substantially annular notch.

12. A pipe liner connector suitable for use with connected pipe sections having an internal liner, the pipe liner connector comprising a substantially cylindrical sleeve located inside the pipe sections having opposed open ends, a first open end including a diametrically increased ring section longitudinally displaced from said open end towards the opposed open end, said first open end including one or more seals located between the open end and the ring section having a diameter intermediate of the cylindrical sleeve and the ring section, wherein the one or more seals provides a liquid tight connection with an internal surface of the internal liner for sealed attachment of the connector to the internal liner of the connected pipe sections, the ring section abutting against the end of the internal liner, and wherein the substantially cylindrical sleeve defines one or more vents extending radially through the cylindrical sleeve to provide fluid communication, in use, between a micro-annulus, formed between the internal liner and the connected pipe sections, and a bore defined by the connected pipe sections, for balancing a pressure differential between the micro-annulus and the bore.

13. A pipe liner connector as claimed in claim 12 wherein said ring section has one or more venting grooves located on the outer surface thereof and extending longitudinally thereon.

14. A pipe liner connector as claimed in claim 12 wherein the one or more vents includes control means for controlling flow of gas through the vents.

15. A pipe liner connector as claimed in claim 12 wherein the ring section engages with the internal surface of the pipe section.

16. A pipe liner connector as claimed in claim 12 wherein a second open end of the sleeve opposes the first open end and includes a second diametrically increased ring section longitudinally displaced toward the first open end.

17. A pipe liner connector as claimed in claim 16 wherein the pipe liner connector includes a shielding ring located between the first and second ring sections.

* * * * *